US009307581B2

(12) United States Patent
Weder

(10) Patent No.: US 9,307,581 B2

(45) Date of Patent: Apr. 5, 2016

(54) INDUCTION HEATING SYSTEM WITH SELF REGULATING POWER CONTROL

(75) Inventor: Heinrich Weder, Engelburg (CH)

(73) Assignee: ELATRONIC AG, Engelburg (CH)

( * ) Notice: Subject to any disclaimer, the term of this patent is extended or adjusted under 35 U.S.C. 154(b) by 325 days.

(21) Appl. No.: 13/978,395

(22) PCT Filed: Jan. 11, 2012

(86) PCT No.: PCT/IB2012/000032

§ 371 (c)(1), (2), (4) Date: Jul. 4, 2013

(87) PCT Pub. No.: WO2012/095732

PCT Pub. Date: Jul. 19, 2012

(65) Prior Publication Data

US 2013/0284723 A1 Oct. 31, 2013

Related U.S. Application Data

(60) Provisional application No. 61/431,469, filed on Jan. 11, 2011.

(51) Int. Cl.

*H05B 6/06* (2006.01)
*H05B 6/12* (2006.01)

(52) U.S. Cl.

CPC .............. *H05B 6/062* (2013.01); *H05B 6/1245* (2013.01); *H05B 6/1272* (2013.01); *H05B 2213/04* (2013.01); *H05B 2213/05* (2013.01); *Y02B 40/126* (2013.01)

(58) Field of Classification Search

CPC .... H05B 6/062; H05B 6/1272; H05B 6/1245; H05B 2213/05; H05B 2213/04; Y02B 40/126

USPC ......... 219/624, 626, 661, 663, 664, 665, 672; 363/134, 91, 251, 261, 262

See application file for complete search history.

(56) References Cited

U.S. PATENT DOCUMENTS

| | | | | |
|---|---|---|---|---|
| 3,843,857 | A | 10/1974 | Cunningham | |
| 4,540,866 | A | 9/1985 | Okuda | |
| 5,111,014 | A * | 5/1992 | Tanaka et al. | 219/626 |
| 2005/0247703 | A1* | 11/2005 | Ryu | 219/661 |

FOREIGN PATENT DOCUMENTS

| | | | |
|---|---|---|---|
| EP | 0 346 860 | A1 | 2/1989 |
| EP | 1 494 505 | A2 | 1/2005 |
| GB | 2 199 454 | A | 7/1988 |
| JP | 2006 114320 | A | 4/2006 |
| WO | WO 2008/055370 | | 5/2008 |

OTHER PUBLICATIONS

International Search Report, PCT/IB2012/000032 Apr. 25, 2012.

* cited by examiner

*Primary Examiner* — Quang Van

(74) *Attorney, Agent, or Firm* — Da Vinci Partners LLC; John Moetteli

(57) ABSTRACT

An induction heating system (46) for use in cooking with a positive feedback mechanism (54, 56) by means of which the power applied to a cooking utensil (52) can be varied in a wide range by changing its position above an induction coil (10), and by means of which the circuitry (54) is automatically protected against overheating.

13 Claims, 4 Drawing Sheets heating power

100% 70% 30%

50

30 $R_{min}$ 20 $R_{max}$ 40

10

INDUCTION HEATING SYSTEM WITH SELF REGULATING POWER CONTROL

CROSS REFERENCE TO RELATED APPLICATIONS

This application claims the benefit of U.S. Provisional Application No. 61/431,469, filed Jan. 11, 2011, the content of which is incorporated herein by reference thereto.

FIELD OF THE INVENTION

The invention relates to an induction heating system for use in cooking, the design of the induction coils, and the control of the power delivered to the cooking utensils.

BACKGROUND OF THE INVENTION

The principle of induction heating for cooking purposes has been known for many decades. It is usually based on one or several induction coils of flat, spiral shape, each one being inserted in a resonance circuit, and forming the primary winding of a transformer. The metallic cooking utensil, such as a pan, forms the secondary winding having essentially a single turn. In operation, the resonance circuit is generally driven off-resonance at a frequency above the audible range. The cooking utensil is heated by eddy currents induced by the time varying magnetic field associated with the induction current, and by magnetic domain switching when magnetic materials are being used.

The power supplied to a pan can be adjusted by positioning the pan at an appropriate position above an induction coil, or, alternatively, by adjusting the power fed into the resonance circuit. This may be realized either in a frequency control mode, wherein the frequency of the driver circuit is changed, or in a pulse control mode, wherein the width of current pulses supplied to the induction coils is changed at a constant frequency (see, e.g. the European patent application no. EP 1 494 505 to Weder, the entire disclosure of which is hereby incorporated by reference).

It has been recognized long ago that it is advantageous to use asymmetric induction coils, as these allow uniform heating of a cooking utensil to various degrees, depending on its location on the stove top (see for example U.S. Pat. No. 3,843,857 to Cunningham, the entire disclosure of which is hereby incorporated by reference). Shifting a pan to the edge of an induction coil and beyond has, however, the effect of causing large phase shifts in the resonance circuit and large induction currents, while the eddy currents in the pan are being reduced. This may cause serious problems of overheating for the transistors of the power supply, which need to switch unnecessarily high currents in comparison to a central position of the cooking utensil.

A similar problem may arise to an even greater extent when improper pans with a low magnetic permeability are being used. In this case the phase shift may be very large at any positioning of the pan relative to the underlying induction coil. It is therefore important to determine the quality of a cooking utensil before applying excessive power to the resonance circuit. One way of checking the quality of a pan is to measure the induction current and the mains current for at least two power settings, and to compare their ratio with predefined set-point values (see for example the International patent application no. WO 2008/055370 to Meier, the entire disclosure of which is hereby incorporated by reference). The ratio depends, however, not only on the material, but also on the size and exact location of the pan. This is why this method may be bothersome to apply.

Furthermore, the use of an inappropriate cooking utensil may lead to equally large phase shifts and coil currents as a badly positioned one, with similar undesired consequences for the driving circuitry.

What is needed therefore is a means of protecting critical circuit elements from overheating caused by the use of poor quality cooking utensils or poor or improper positioning of the cooking utensil on the coil.

SUMMARY OF THE INVENTION

The present invention solves the problem of achieving a large dynamic range of the power supplied to a cooking utensil by simply translating the utensil above an appropriately designed asymmetric induction coil, the design of which allows uniform heating irrespective of the exact location of said utensil. The problem of large current switching due to increasing phase shifts, arising either as a result of this translation, or as a result of using inappropriate cooking ware, is eliminated by means of an intelligent control, limiting the power supplied to the resonance circuit.

It is an object of the invention to provide a simple means of regulating the power dissipated in a cooking utensil.

It is another object of the invention to provide a simple means against overheating of the driving circuitry, irrespective of the size, nature and positioning of the cooking utensil.

DETAILED DESCRIPTION

Figure 1:
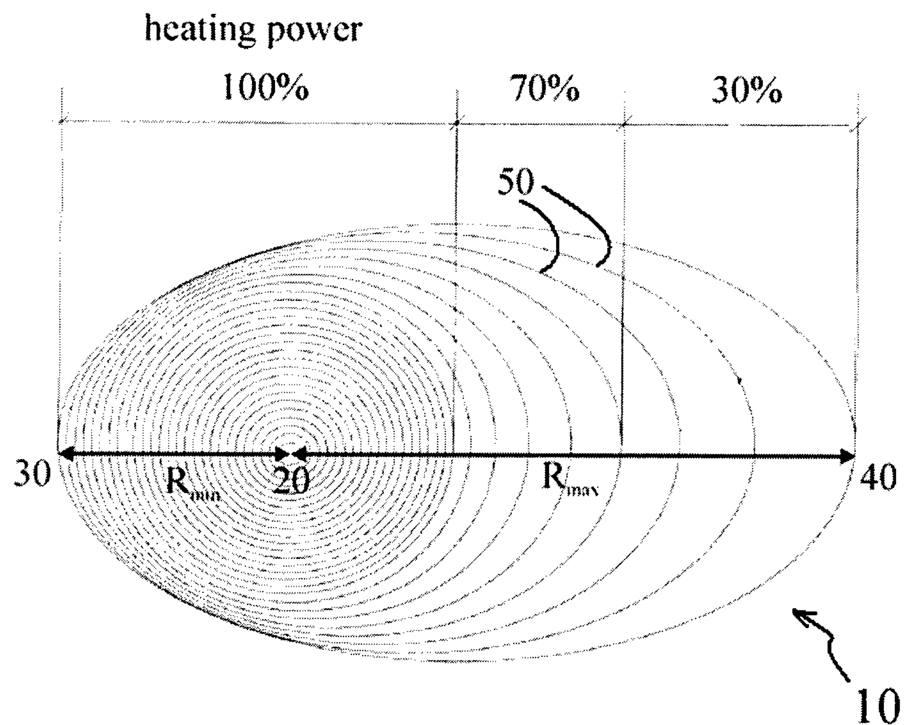
FIG. 1 is a schematic drawing of an asymmetric induction coil in accordance with this invention.

FIG. 1 shows the special asymmetric induction coil design of the present invention. The flat spiral coil 10 is of an approximately elliptic shape. The asymmetrical shape of the coil 10 may be defined as a flat spiral coil which includes at least one inner turn 50 of substantially circular or elliptical form around a centre 20, and at least one outer turn 60 of substantially elliptical form. The center 20 is located on the major axis of the ellipse of the outer turn at distances of $R_{min}$ and $R_{max}$ from opposite edges 30, 40 of the outermost turn. In a preferred embodiment, the ratio of $R_{max}/R_{min}$ is in the range of 5:1 to 2:1, or preferably in the range of 4:1 to 3:1. In another embodiment, the ratio of $R_{max}/R_{min}$ is in the range of 4:1 to 2:1, or preferably in the range of 3:1 to 2:1.

By means of these choices, using coil 10 as part of a system for induction heating of a cooking utensil, the power supplied to the cooking utensil can be varied from 100% of the power of an unregulated power supply to about 30%, when the utensil is shifted from position 20 of highest density of turns 50 of coil 10 to the position of minimal density of turns near edge 40 of the coil.

Figure 2:
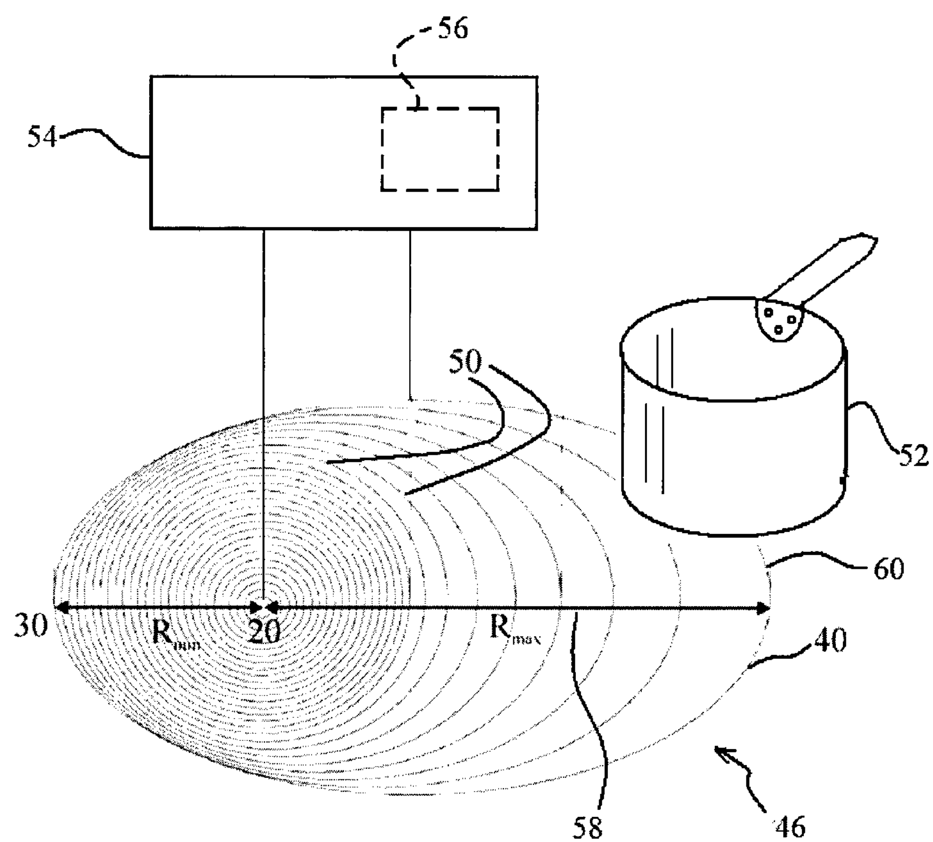
FIG. 2 is a schematic drawing of a system of the invention.
Figure 3:
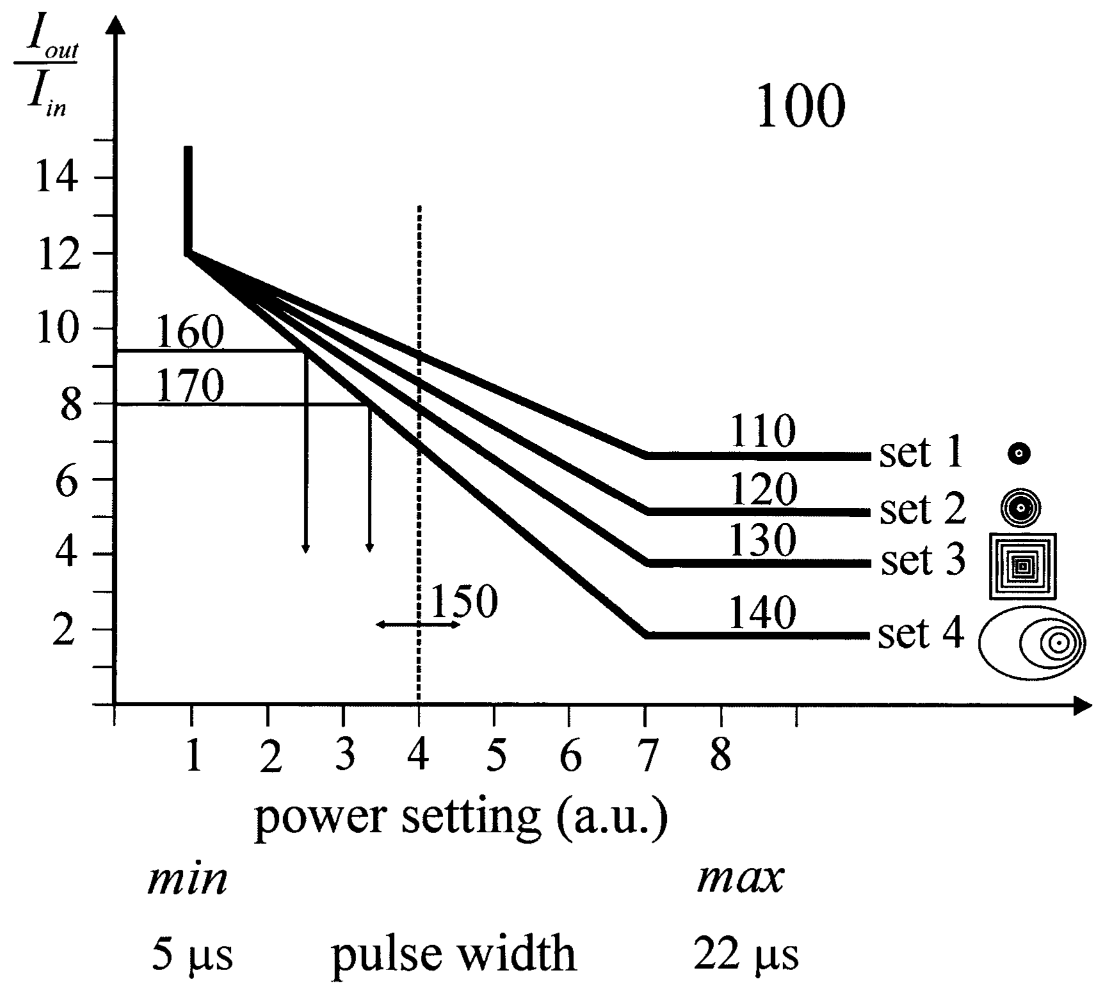
FIG. 3 is a schematic drawing of the power limits supplied to induction coils of varying shapes.

Referring to FIGS. 2 and 3, the coil 10 is used as part of a system 46 for induction heating of a cooking utensil 52 for use in cooking. Such a system 46 includes a pulse-driven resonance circuit 54. The resonance circuit 54 includes an intelligent controller 56 which controls pulse width so as to vary the power applied to the at the coil 10 between a minimum and a maximum value 110, 120, 130, 140. The maximum value is limited based on limit information (e.g., a limit curve 110, 120, 130, 140) derived from a comparison of a ratio of current flowing to the resonance circuit of a particular coil arrangement set 1, 2, 3 or 4, for example, divided by the mains current in and the power setting. In this manner, the system 46 protects the circuit 52, at least the critical elements thereof, from overheating due to the use of poor quality cooking utensils or poor positioning of the cooking utensil on the coil.

The quality of the cooking utensil 52 and its position with respect to the coil 10 is automatically recognized by the controller 56. The power delivered to the induction coil 10 is automatically selectable between a minimum value and a maximum value. The maximum value is determined by any one of the following: (1) the quality of the cooking utensil recognized; (2) the position of the cooking utensil above the at least one coil recognized; and (3) the power set-point chosen by the operator.

Minimum power is applied to the coil 10 when the controller 56 identifies a cooking utensil 52 as being unsuitable for induction cooking by detecting a ratio between current flowing to the resonance circuit and the mains current above a limit (above, e.g., a limit curve 110, 120, 130, 140) depending on the particular coil arrangement. The minimum power is also applied to the coil 10 when the controller 56 identifies an absent or ill positioned cooking utensil 52 by detecting a ratio between current flowing to the resonance circuit 54 and the mains current above a limit depending on the particular coil arrangement.

According to the invention, this change of power can be realized while keeping the heating power nearly uniform across the diameter of the pan.

According to the invention, the power range accessible by merely shifting the cooking utensil can be greatly expanded by using a self-regulating power limitation, which will now be explained by reference to diagram 100 depicted in FIG. 3. Diagram 100 applies to a pulse width controlled mode of power regulation wherein $I_{out}/I_{in}$ is the ratio of the current $I_{out}$, flowing in the resonance circuit, and the mains current $I_{in}$. The four curves 110, 120, 130 and 140 define boundaries of maximum power which may be delivered to the resonance circuits for four different sets of induction coil designs. Set 1 corresponds to a small circular coil, set 2 to a large circular coil, set 3 to a large coil with straight segments, and finally set 4 to the asymmetric coil 10 sketched in FIG. 1. The power delivered to the resonance circuit changes from about 100 W at the smallest pulse width of 5 μs to about 3.5 kW at the largest pulse width of 22 μs for the induction coil 10 of set 4, and for a single-phase power supply. For a three-phase power supply the maximum power may reach about 6 kW. The power supplied to a cooking utensil is controlled by choosing the set-point of the highest power to be delivered to the cooking utensil 52 when the cooking utensil is positioned near the center 20 of coil 10; and then positioning the cooking utensil anywhere on coil 10. The power supplied to the cooking utensil is variable in the range from 100% of the maximum power deliverable by the system to 5% of this power, by (a) choosing the set-point for the maximum power deliverable by the system; and (b) shifting the cooking utensil from the central position 20 of coil 10 to a position near the edge 40 of the coil.

The built-in intelligent power limitation according to the invention prevents the power delivered to the resonance circuit to ever exceed the limiting values defined by curves 110 to 140, without requiring any active interference by an operator.

An example will now be given, demonstrating safe operation of the induction heater, irrespective of the quality of a cooking utensil. Suppose now that a cook desires to operate the system at a power corresponding to about 50% of the maximum power deliverable by the system. He/she will hence choose a setting 150 of the potentiometer or toggle switches of about 4 in diagram 100 of FIG. 3. Upon turning on, the system will deliver a minimum power of about 100 W to a cooking utensil of any shape, size and quality, corresponding to a power setting of 1 in FIG. 3. Depending on the nature of the cooking utensil the ratio $I_{out}/I_{in}$ will decrease from infinity to some particular value, when the pan is put onto the stove and shifted to some position within the cooking field. The higher this ratio the larger the phase shift in the resonance circuit, meaning that the cooking utensil is either of poor quality or ill positioned on the stove or both.

Let us now assume the cooking utensil has been placed above a coil of set 4, for which the power delivered by the system is limited by curve 140, and that the utensil is of poor quality, such that the value of $I_{out}/I_{in}$ is relatively high, namely for example 9.5, as indicated by curve 160 in diagram 100. Upon sweeping the power towards the set-point value, the system will reach the built-in power limitation corresponding to a setting of about 2.5 on the abscissa of FIG. 3, whereupon further heating will stop. In other words, the set-point will never be reached for a pan of poor quality.

Alternatively, a careless cook may have chosen a proper pan, but positioned it at the very edge of the cooking field or even beyond, such that $I_{out}/I_{in}$ may have a value of for example 8, indicated by curve 170 in FIG. 3. Again, the built-in power limitation will become active, and the power ramp will stop at a value corresponding to a setting of about 3.3 in FIG. 3.

Had the cook, however, properly positioned a suitable pan somewhere within the cooking field of the coil, giving rise to a ratio $I_{out}/I_{in}$ below about 7, the 50% power level corresponding to the chosen set-point of four, labelled by 150 in FIG. 3, could of course have been reached. This automatic limitation of the power delivered to the resonance circuit, once a critical value of the ratio $I_{out}/I_{in}$ is reached, hence protects the power transistors very effectively against overheating.

It will now be shown that the combination of special coil 10, corresponding to set 4 of diagram 100, with the self-regulation power limitation indicated by curve 140, results in a very simple way of controlling the power delivered to a cooking utensil over a very large range from 100% to about 5% of the maximum power delivered by the power control.

In a preferred embodiment, the system first enters a pan search mode upon being switched on. In this mode, 50 ms wide pulses spaced about 1000 ms apart, are being delivered to the induction coils at the minimum power of 100 W. It is only after the cooking utensil has been recognized as a proper induction pan that the normal cooking process may commence. The same search mode is also in operation whenever a cooking utensil being removed from the stove.

Suppose that a cooking utensil, recognized as being of high quality, has been placed upon such a stove. Suppose furthermore that the system would determine the ratio $I_{out}/I_{in}$ to have a value of two if the cooking utensil were positioned at central position 20 of coil 10. Under such a condition, the system would automatically ramp the power to its maximum value, if the cook decided to apply the maximum power by choosing setting 8 on the potentiometer or toggle switches of diagram 100 in FIG. 3. If now the cook desired to reduce the power delivered to his/her cooking utensil from the maximum of 100%, to any value down to the minimum of about 5%, all he/she would have to do is to shift the pan away from position 20 towards edge 40 of coil 10.

Figure 4:
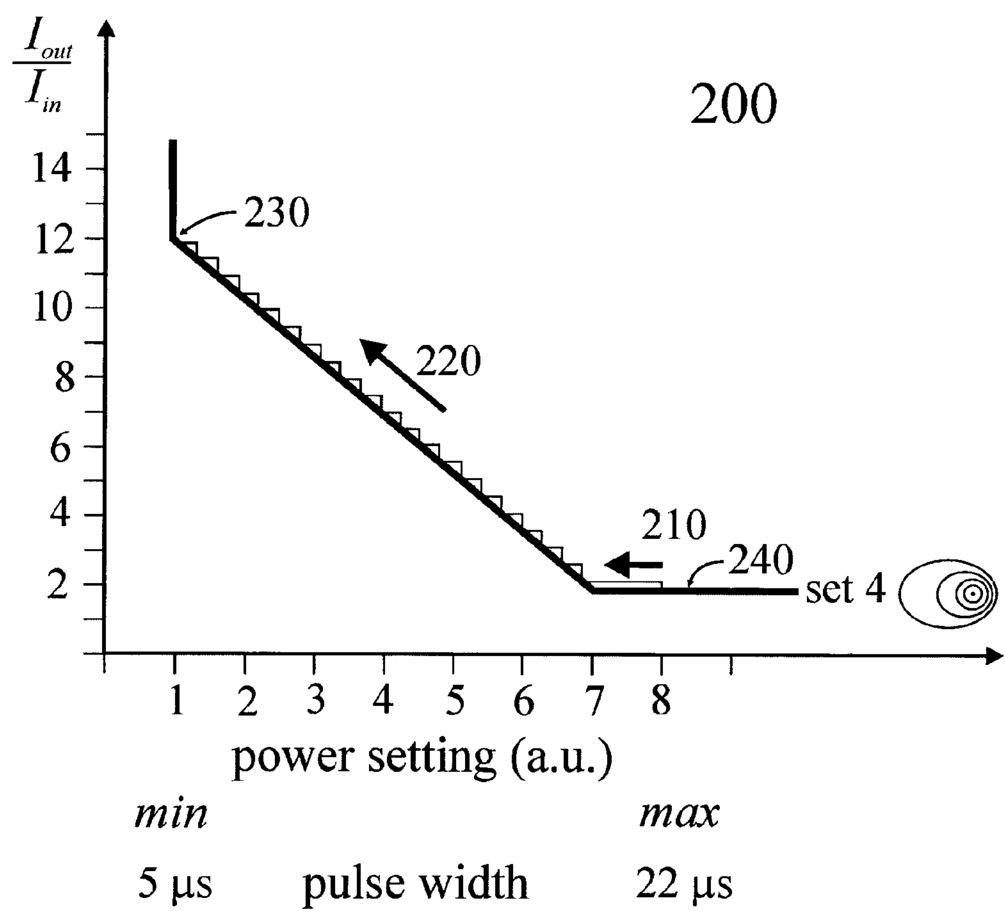
FIG. 4 shows the power reduction during pan movement from the center of an asymmetric coil to its edge.

Let us see in some more detail what will happen when the cooking utensil is shifted a little bit away from its central position 20 after the maximum power has been reached by reference to FIG. 4. The intelligent power limitation described above will in fact act as a positive feedback, since upon shifting the utensil the phase shift or $I_{out}/I_{in}$ ratio will rise, such that the system finds itself above curve 240 in diagram 200. The system will therefore reduce the power automatically as indicated by arrow 210 in diagram 200, i.e. by reducing the pulse width, until curve 240 is being crossed again. If the cooking utensil were kept stationary upon reaching this point, the power delivered to coil 10 would no longer change. Were the cook, however, to continue shifting the pan towards edge 40 of coil 10, the power would continuously decrease, as the feedback mechanism would force the system to follow curve 240 in the direction of arrow 220. This process would continue until the cooking utensil reaches the very edge 40 of coil 10, at which point the power has its minimum value indicated by point 230 in diagram 200, which in practice amounts to about 100 W.

In an advantage, in addition to protecting the system against overheating, the positive feedback mechanism just described thus helps to control the power over a wide range, by simply displacing a cooking utensil above asymmetric coil 10.

In another advantage, the invention provides a simple means of regulating the power dissipated in a cooking utensil.

In still another advantage, the invention provides a simple means against overheating of the driving circuitry, irrespective of the size, nature and positioning of the cooking utensil.

Moreover, the system contemplates the use, sale and/or distribution of any goods, services or information having similar functionality described herein.

The specification and figures should be considered in an illustrative manner, rather than a restrictive one and all modifications described herein are intended to be included within the scope of the invention claimed. Accordingly, the scope of the invention should be determined by the appended claims (as they currently exist or as later amended or added, and their legal equivalents) rather than by merely the examples described above. Steps recited in any method or process claims, unless otherwise expressly stated, may be executed in any order and are not limited to the specific order presented in any claim. Further, the elements and/or components recited in apparatus claims may be assembled or otherwise functionally configured in a variety of permutations to produce substantially the same result as the present invention. Consequently, the invention should not be interpreted as being limited to the specific configuration recited in the claims.

Benefits, other advantages and solutions mentioned herein are not to be construed as critical, required or essential features or components of any or all the claims.

As used herein, the terms "comprises", "comprising", or variations thereof, are intended to refer to a non-exclusive listing of elements, such that any apparatus, process, method, article, or composition of the invention that comprises a list of elements, that does not include only those elements recited, but may also include other elements described in the instant specification. Unless otherwise explicitly stated, the use of the term "consisting" or "consisting of" or "consisting essentially of" is not intended to limit the scope of the invention to the enumerated elements named thereafter, unless otherwise indicated. Other combinations and/or modifications of the above-described elements, materials or structures used in the practice of the present invention may be varied or adapted by the skilled artisan to other designs without departing from the general principles of the invention. The patents and articles mentioned above are hereby incorporated by reference herein, unless otherwise noted, to the extent that the same are not inconsistent with this disclosure.

Other characteristics and modes of execution of the invention are described in the appended claims.

Further, the invention should be considered as comprising all possible combinations of every feature described in the instant specification, appended claims, and/or drawing figures which may be considered new, inventive and industrially applicable. Copyright may be owned by the Applicant(s) or their assignee and, with respect to express Licensees to third parties of the rights defined in one or more claims herein, no implied license is granted herein to use the invention as defined in the remaining claims. Further, vis-à-vis the public or third parties, no express or implied license is granted to prepare derivative works based on this patent specification, inclusive of the appendix hereto and any computer program comprised therein. Multiple variations and modifications are possible in the embodiments of the invention described here. Although certain illustrative embodiments of the invention have been shown and described here, a wide range of changes, modifications, and substitutions is contemplated in the foregoing disclosure. While the above description contains many specific details, these should not be construed as limitations on the scope of the invention, but rather exemplify one or another preferred embodiment thereof. In some instances, some features of the present invention may be employed without a corresponding use of the other features. Accordingly, it is appropriate that the foregoing description be construed broadly and understood as being illustrative only, the spirit and scope of the invention being limited only by the claims which ultimately issue in this application.

ADDENDUM

The following US and Foreign patent documents are incorporated herein by reference thereto and relied upon:

US PATENT DOCUMENTS

| | | |
|---|---|---|
| 3,843,857 | October 1974 | Cunningham |

OTHER PATENT DOCUMENTS

| | | |
|---|---|---|
| EP1 494 505 A2 | May 2005 | Weder |
| WO 2008/055370 A1 | May 2008 | Meier |

The invention claimed is:

1. A system for induction heating for use in cooking with at least one induction coil forming part of a pulse-driven resonance circuit driven by a pulse having a pulse width, the system comprising:

a. at least one coil; and b. a controller controlling the pulse width so as to vary the power applied to the at least one coil between a minimum and a maximum value, the maximum value limited based on limit information derived from a comparison of a ratio of current flowing to the resonance circuit of a particular coil arrangement divided by the mains current in and a power setting, the system thereby protecting the circuit from overheating.

2. The system of claim 1, wherein critical system components are protected from overheating by a controller controlling the pulse width so as to vary the power applied to the at least one coil between a minimum and a maximum value, the maximum value limited based on limit information derived from a comparison of a ratio of current flowing to the resonance circuit of a particular coil arrangement divided by the mains current in and the power setting.

3. The system of claim 1, wherein a. the quality of the cooking utensil and its position with respect to the coil is automatically recognized by the controller, and b. the power delivered to the at least one induction coil is automatically selectable between a minimum value and a maximum value, wherein the maximum value is determined by any one of i. the quality of the cooking utensil recognized;

ii. the position of the cooking utensil above the at least one coil recognized; and iii. the power set-point chosen by the operator.

4. The system of claim 1, wherein the minimum power is applied to the at least one induction coil when the controller identifies a cooking utensil as being unsuitable for induction cooking by detecting a ratio between current flowing to the resonance circuit and the mains current above a limit depending on the particular coil arrangement.

5. The system of claim 1, wherein the minimum power is applied to the at least one induction coil when the controller identifies an absent or ill positioned cooking utensil by detecting a ratio between current flowing to the resonance circuit and the mains current above a limit depending on the particular coil arrangement.

6. The system of claim 1, wherein the minimum power applied to the at least one induction coil is about 100 W.

7. The system of claim 1, wherein the maximum power deliverable to the at least one coil is about 3.5 kW for a single phase power supply and about 6 kW for a three-phase power supply.

8. The system of claim 1, wherein the pulse width varies in a range between about 5 μs for the minimum power to about 22 μs for the maximum power deliverable to the at least one coil.

9. The system of claim 1, wherein the coil is of asymmetrical form.

10. The system of claim 9, wherein the asymmetrical shape of the coil comprises a flat spiral with at least one inner turn of substantially circular form around a centre, and at least one outer turn of substantially elliptical form, and wherein said centre is located on the major axis of the ellipse at distances of $R_{min}$ and $R_{max}$ from opposite edges of the outermost turn.

11. The system of claim 10, wherein the ratio of $R_{max}/R_{min}$ is in the range of 5:1 to 2:1.

12. The system of claim 11, wherein the power supplied to a cooking utensil is controlled by a. choosing the set-point of the highest power to be delivered to the cooking utensil when the cooking utensil is positioned near the centre of asymmetrical coil; and b. positioning the cooking utensil anywhere on coil.

13. The system of claim 11, wherein the power supplied to a cooking utensil is variable in the range of from 100% of the maximum deliverable power to 5% of the maximum deliverable power by a. choosing the set-point for the maximum power deliverable by the system; and b. shifting the cooking utensil from the central position of coil to a position near the edge of coil.

* * * * *